C. E. SNEIDER.
Sight for Fire Arms.
No. 97,717.
Patented Dec. 7, 1869.
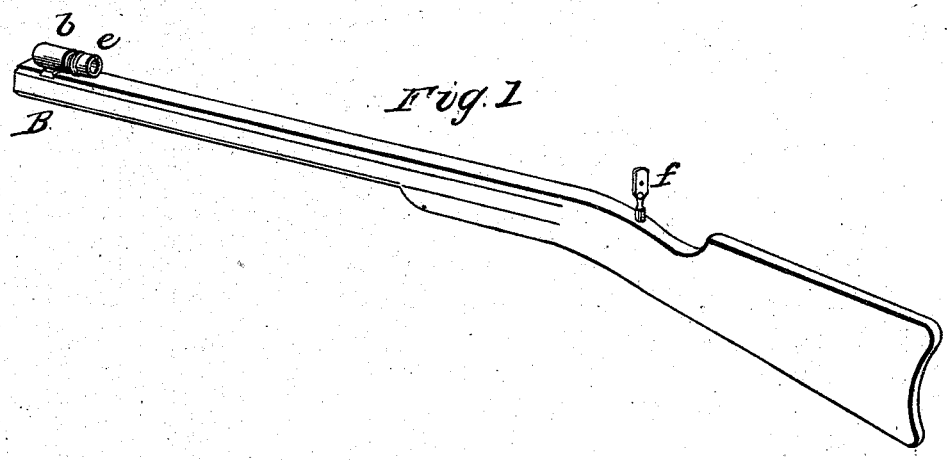
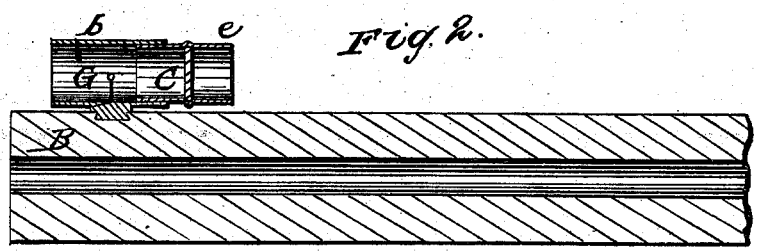
Witnesses
Jno. D. Patten
Edmund Masson
Inventor
Charles Edward Sneider.
By atty A. B. Stoughton.

United States Patent Office.

CHARLES EDWARD SNEIDER, OF BALTIMORE, MARYLAND.[*]

Letters Patent No. 97,717, dated December 7, 1869.

IMPROVEMENT IN SIGHTS FOR FIRE-ARMS.

The Schedule referred to in these Letters Patent and making part of the same.

*To all whom it may concern:*

Be it known that I, CHARLES EDWARD SNEIDER, of Baltimore, in the State of Maryland, have invented certain new and useful Improvements in connection with the "Front Sights" of Rifles, and other fire-arms; and I do hereby declare the following to be a full, clear, and exact description of the same, reference being had to the accompanying drawings, making a part of this specification, in which—

Figure 1 represents, in perspective, and on a small scale, a means of applying my invention to a fire-arm.

Figure 2 represents, on an enlarged scale, a section through the front sight, and a lens applied thereto, and through a portion of a rifle, or other gun-barrel.

My invention consists in using, in connection with the front sight of a fire-arm, a lens for magnifying distant objects, and aiding the user in sighting said objects or the object aimed at.

To enable others skilled in the art to make and use my invention, I will proceed to describe the same, with reference to the drawings.

*a* represents the front sight of a fire-arm, arranged, as is usual, at or near the point or end of the barrel B; and this sight I have represented as shaded or covered by a tube, *b*, which is a common practice.

In connection with this front sight *a*, I use a lens, *c*, of ordinary magnifying capacity, to suit the age or vision of the user, and this lens, for convenience, I arrange in a small tube, *e*, by which it may be readily placed in either end of the sight-tube *b*, and as readily carried in the pocket, or secured to the person, when not required for use on the gun.

I prefer the lens arranged in a tube, as shown, for the reason that it shades the glass from flashing light while sighting; but I do not confine my invention to this construction of sight, or of lens, for the sight may be of any of the known kinds, and the lens connected with it, or arranged upon the gun-barrel in proximity to it, in rear or in front, so that its magnifying-capacity may be used and availed of, in sighting or aiming the gun, may be made and used in many forms, and my invention extends to the use of any known magnifying lens, with any known front sight of a fire-arm.

I find that a gauge or guide, *f*, near the rear sight, to direct the eye or vision of the user, is advantageous, but not indispensible.

So long as a magnifying-lens is used in connection with the front sight, whether permanently set, in proximity thereto, or removable or replaceable, or made adjustable therewith, or in relation thereto, it would come within the scope of my invention, and whether the lens be of a convex, or any other known form that would magnify objects.

Having thus fully described my invention, and shown how it may be applied and used, I would state that I am aware that a telescope has been used in connection with the rear sight of a fire-arm, and also extending along the whole, or nearly the whole length of the barrel. I do not claim either of these things; but

What I do claim as new, and desire to secure by Letters Patent, is—

In combination with the front sight of a fire-arm, a lens, located in close proximity thereto, so as to leave the intervening space between said front sight, or lens, and the rear sight unobstructed, and the natural vision of the user unaffected, until it reaches the lens, or front sight, at or near the front of the barrel, as herein described and represented.

C. EDW. SNEIDER.

Witnesses:
A. B. STOUGHTON,
I. PENNINGTON, Jr.

[*] *Assignor to himself & Josias Pennington Jr. of same place.*